United States Patent [19]
Murty et al.

[11] Patent Number: 6,154,833
[45] Date of Patent: *Nov. 28, 2000

[54] SYSTEM FOR RECOVERING FROM A CONCURRENT BRANCH TARGET BUFFER READ WITH A WRITE ALLOCATION BY INVALIDATING AND THEN REINSTATING THE INSTRUCTION POINTER

[75] Inventors: Keshavram N. Murty; James A. Stone, both of Phoenix, Ariz.; Kiran A. Padwekar, Santa Clara, Calif.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/911,141

[22] Filed: Aug. 11, 1997

[51] Int. Cl.[7] ........................................................ G06F 9/44
[52] U.S. Cl. .......................................... 712/238; 712/219
[58] Field of Search .................................... 711/125, 123, 711/130, 169, 147, 133, 136, 137, 158, 159, 160, 167; 712/219, 237, 240, 238, 239

[56] References Cited

U.S. PATENT DOCUMENTS

| | | | |
|---|---|---|---|
| 5,224,214 | 6/1993 | Rosich | 710/39 |
| 5,404,483 | 4/1995 | Stamm | 711/425 |
| 5,432,918 | 7/1995 | Stamm | 711/156 |
| 5,526,510 | 6/1996 | Akkary | 711/156 |
| 5,574,871 | 11/1996 | Hoyt et al. | 712/200 |
| 5,717,896 | 2/1998 | Yung et al. | 712/205 |

*Primary Examiner*—John A. Follansbee
*Assistant Examiner*—Stacy Whitmore
*Attorney, Agent, or Firm*—Blakely, Sokoloff, Taylor & Zafman LLP

[57] ABSTRACT

A circuit and method for handling a hardware conflict experienced by a branch target buffer. The method for handling the hardware conflict includes three steps. First, a determination is made to detect whether there is a write allocation to a branch target buffer (BTB) cache. If so, precedence is given to the write allocation by invalidating at least a first instruction pointer within a BTB pipeline. The first instruction pointer would have been used to read information from the BTB cache for branch prediction, absent the write allocation. Thereafter, the first instruction pointer is recovered by reloading it into the BTB pipeline in order to avoid missing its opportunity to predict. The two cycle delay caused by the invalidation and recovery of the first instruction pointer has little effect on the performance level of the circuit practicing this method of operation.

11 Claims, 5 Drawing Sheets

THIS IPd COULD NOT PERFORM A CACHE READ FOR PREDICTION SINCE SOME OTHER IP IN ITS BU4 STAGE CONCURRENTLY PERFORMED A CACHE WRITE

FIG. 8

SYSTEM FOR RECOVERING FROM A CONCURRENT BRANCH TARGET BUFFER READ WITH A WRITE ALLOCATION BY INVALIDATING AND THEN REINSTATING THE INSTRUCTION POINTER

BACKGROUND OF THE INVENTION

1. Field of the Invention

The present invention relates to the field of electronics. Particularly, the invention relates to a circuit and method for handling a BTB hardware conflict within a deeply pipelined electronic system without inducing a stall.

2. Description of Related Art

Early microprocessors generally processed instructions in a serial manner. Each instruction was processed in four (4) sequential stages: instruction fetch, instruction decode, instruction execute, and result writeback (retire). Within these microprocessors, different dedicated logic blocks were implemented to support each processing stage. Thus, before beginning its operation, a logic block was required to wait until any previous logic block(s) completed its (their) operations.

To improve efficiency, more recent microprocessors (referred to as "pipelined microprocessors") have been designed to operate on several instructions simultaneously by overlapping the operations performed in the fetch, decode, execute, and retire stages. More specifically, during each processing stage, a pipelined microprocessor concurrently processes different instructions. At the beginning of each clock cycle, the result of each processing stage is passed to the next processing stage. One type of pipelined microprocessor, referred to as a "deeply pipelined" microprocessor, further divides each selected processing stage into substages for additional performance improvement.

In order for a deeply pipelined microprocessor to operate efficiently, an instruction fetch unit (IFU) is situated at the front of an instruction pipeline in order to continually provide the pipeline with a stream of instructions, namely macro-instructions. However, a branch instruction within an instruction stream prevents the IFU from fetching subsequent instructions until the branch is fully resolved. A "branch instruction" is any instruction disrupting normal, sequential program flow such as, for example, a conditional JUMP, an unconditional JUMP, a CALL instruction or a RETURN instruction. In pipelined microprocessors, the branch cannot be fully resolved until the branch instruction reaches the execution stage near the end of the pipeline. As a consequence, the IFU usually will be temporarily stalled by not fetching any more instructions because the unresolved branch condition prevents the IFU from knowing which instruction(s) to fetch next.

To alleviate this problem, many pipelined microprocessors use branch prediction mechanisms to predict the existence and the outcome of branch instructions within an instruction stream. One type of branch prediction mechanism is a branch target buffer (BTB) circuit which receives an instruction pointer (IP) from the IFU every clock cycle and accesses information within a memory unit of the BTB circuit for predicting code flow. Typically, the memory unit (referred to as a "BTB cache") is a random access memory (RAM) having a single read/write port and several read-only and/or write-only ports. The BTB cache contains historical information regarding IPs that have already been identified as branch instructions and that are again being executed by a pipelined microprocessor. A single read/write port architecture is preferred for cost reasons and reduced die area requirements.

By accumulating historical information (e.g., branch type, IP, target IP, etc.) associated with previously executed branch instructions, the BTB circuit is able to better predict whether an incoming branch should be "not taken" (e.g., follow sequential address retrieval) or "taken" (e.g., follow the instruction fetch path created through prediction). The action of "taking" an incoming branch involves "resteering" the IFU to start fetching instructions starting at the targeted IP. The benefit of the BTB circuit is to improve performance by providing advance information to the IFU, instead of the IFU waiting for an instruction decode unit (IDU) to decode the instruction.

Due to the preferred BTB cache architecture, a BTB hardware conflict may occur when a cache read occurs concurrently with a particular type of cache write referred to as an allocation. An "allocation" is a condition where information associated with a new branch instruction is written into a newly created entry of the BTB cache. The cache read is used to obtain information as to whether the current instruction is a known branch instruction.

If a BTB hardware conflict is detected, two conventional solutions have usually been used. The first conventional solution involves implementing a dual read/write port RAM as the BTB cache. However, this would be a costly solution because the BTB cache would occupy a greater percentage of die area. The second conventional solution involves inducing a stall. However, a stall requires a great amount of complexity to avoid pipeline slips (i.e., loss of synchronization between multiple pipelines) and to accurately stall logic units substantially downstream from the IFU. Both of these conventional solutions are inadequate respective to cost and performance issues.

SUMMARY OF THE INVENTION

The present invention relates to a circuit and method for handling a hardware conflict. This method includes a plurality of steps. One step involves detecting a write allocation to a branch target buffer (BTB) cache. Thereafter, the next step involves giving precedence to the write allocation by invalidating at least one instruction pointer, such as a first instruction pointer for example, within a BTB pipeline. The first instruction pointer would have been used to read information from the BTB cache for branch prediction, absent the write allocation. This avoids the hardware conflict. Thereafter, the first instruction pointer is recovered by reloading it into the BTB pipeline.

BRIEF DESCRIPTION OF THE DRAWINGS

The features and advantages of the present invention will become apparent from the following detailed description of an embodiment of the present invention in which.

DESCRIPTION OF THE PREFERRED EMBODIMENT

A circuit and method for preventing unacceptable performance loss due to a branch target buffer (BTB) hardware conflict encountered by a BTB circuit described herein. In particular, the method pertains to an efficient scheme for handling a BTB hardware conflict by performing a cache write and by recovering a missed opportunity to predict by resteering front-end circuitry to restart fetching instructions associated with the non-predicted instruction pointer.

Herein, a number of terms and symbols are frequently used to describe certain hardware and characteristics. For example, a "processor" is a single integrated circuit (IC) component or a multiple IC components having processing capabilities. Examples of a processor include, but are not limited or restricted to a microprocessor or any hardware capable of executing code. An "electronic system" is broadly defined as any product having the processor such as any type of computer (e.g., desktop, laptop, hand-held, server, etc.), a wireless telephone, and the like. A "line" is broadly defined as one or more information-carrying mediums such as electrical wire(s), bus trace(s), fiber optic(s), a wireless communication channel(s), infrared "IR" link(s), radio frequency "RF" link(s), and the like. The terms "asserted" and "deasserted" (and other tenses) are broadly defined as setting a line to a selected first and second voltage levels, respectively. Likewise, the terms "active" and "inactive" (and other tenses) broadly describe a particular voltage level of a signal. For example, an active signal may have a voltage level representative of a logic "1" or even a logic "0" if an active-low signal.

Figure 1A:
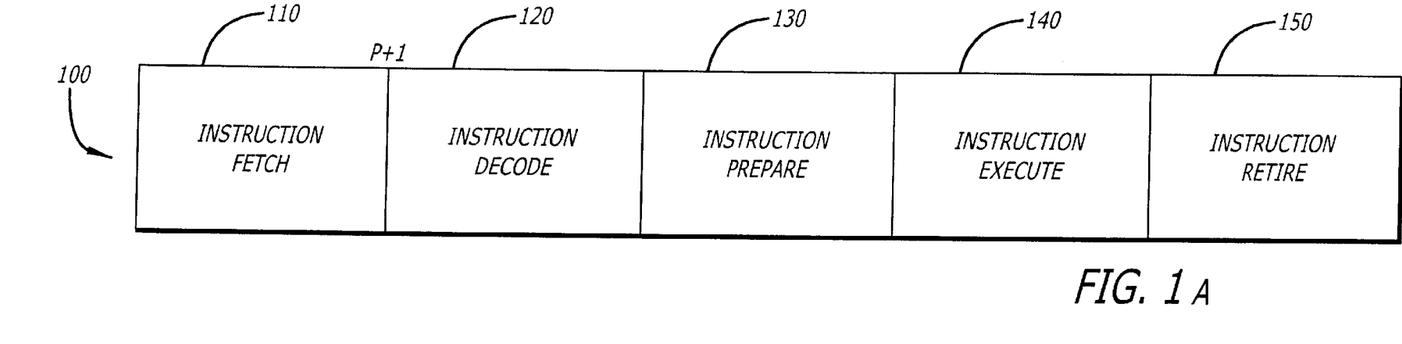
FIGS. 1A–1C are block diagrams of an instruction pipeline processed by a deeply pipelined microprocessor along with a branch target buffer (BTB) pipeline.

Referring to FIG. 1A, various processing stages of an instruction pipeline 100 supported by a processor (e.g., a deeply pipelined microprocessor) are shown. Instruction pipeline 100 includes a plurality of processing stages such as an instruction fetch 110, instruction decode 120, instruction prepare 130, instruction execute 140 and writeback result (referred to as an "instruction retire") 150. Some or all of these processing stages may be divided into several different substages to support deeply pipelined operations.

For example, the fetch stage 110 may include "p" pipeline substages used to fetch instructions ("p" is a positive whole number). Within these "p" pipeline substages, some instructions may be fetched based on predictions by a BTB circuit of FIG. 3. These in-flight (pipeline loaded) instructions are then decoded during the decode stage 120 and prepared for execution during the prepare stage 130. Next, a processor executes instructions during the execute stage 140 and these instructions are "retired" by loading information (e.g., a data computation) into on-board memory of the processor.

For efficient microprocessor operation, the "p" substages of the instruction fetch stage in FIG. 1A must continually fetch a stream of instructions. Each fetched instruction is not fully executed until it reaches the execute stage 140. Branch instructions within the instruction stream often direct the processor to begin executing instructions at a non-sequential address called a branch target address. When a pipelined processor encounters a branch instruction, the fetch stage 110 cannot immediately react to the branch instruction since it has not yet been decoded or executed. Thus, the branch instruction can cause a pipelined processor, especially a deeply pipelined microprocessor, to pre-fetch from the wrong code space such that the processor must later flush the pre-fetched instructions and restart at a corrected address.

To prevent this situation, the processors associated with the present invention employs a BTB circuit that predicts branch instructions within the instruction stream to a good degree of accuracy. The BTB circuit is described below in the context of a deeply pipelined microprocessor. However, it is apparent to those skilled in the art that individual features of the disclosed BTB circuit can be implemented in other types of processors besides those deeply pipelined.

Figure 1B:
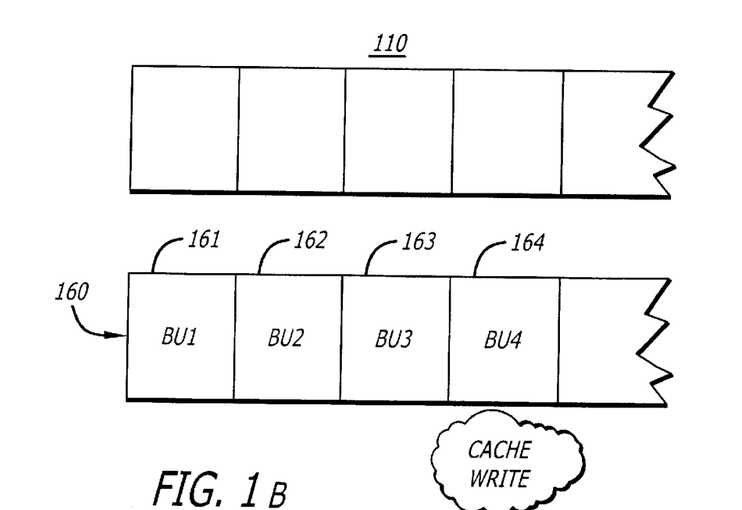

Referring to FIG. 1B, a back-end BTB pipeline 160 propagates information for branch update (described below). In the current implementation, although BTB pipeline 160 supports 32-bit addressing, it is contemplated that the back-end BTB pipeline 160 may be appropriately altered to support 64-bit addressing.

Figure 1C:
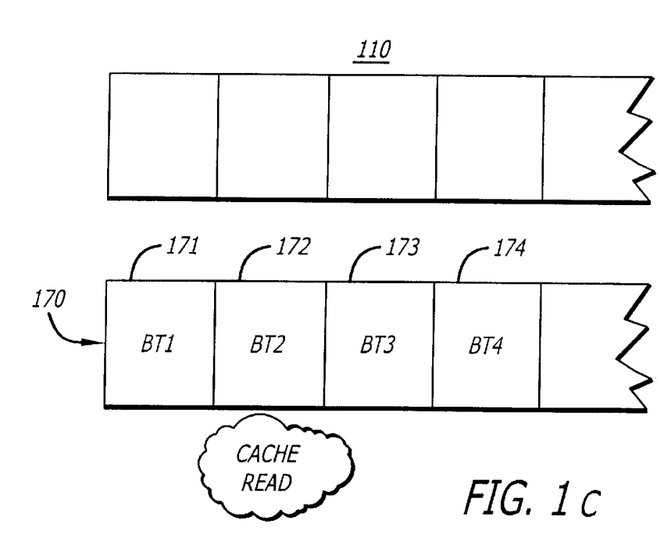

For example, as shown, the back-end BTB pipeline 160 includes four pipeline stages 161–164. A first stage (BU1) 161 involves the BTB circuit receiving branch resource information (described below). Upon receiving this information, memory within the BTB circuit (referred to as "BTB cache") is accessed during a second stage (BU2) to obtain tag and offset information from the BTB cache. Upon completing the cache read, this tag and offset information is compared with corresponding branch resource information during the third stage (BU3). This comparison is performed to determine whether a resteer condition is to occur when writing data into the BTB cache during the fourth cycle (BU4). A "resteer condition" is defined as an intended deviation in sequential instruction flow and may include a "real resteer" or an "artificial resteer" described below. The real resteer occurs in response to a branch instruction detected in BT3 as shown in FIG. 1C. The artificial resteer occurs in response to a BTB hardware conflict in BU4 (see FIG. 1B) in order to signal front-end circuitry to recover a missed opportunity to predict an in-flight IP.

Referring now to FIG. 1C, a front-end BTB pipeline 170 is illustrated as including multiple pipeline stages (e.g., 4 stages 171–174). Represented as pipeline stages BT1–BT4, these stages are used for branch prediction in which a BTB cache read occurs at BT2 stage. New instruction pointers (IPs) are loaded into the front-end BTB pipeline 170 each clock cycle. A BTB hardware conflict occurs when a cache read at BT2 happens in the same cycle as a write allocation (or referred to as "allocation" for brevity) at BU4.

Figure 2:
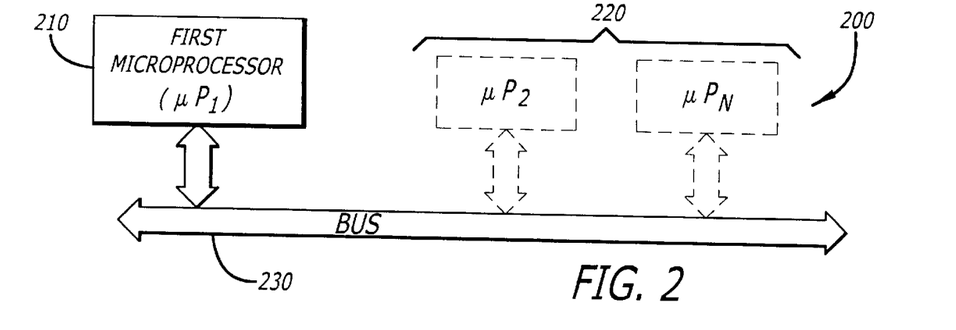
FIG. 2 is a block diagram of an electronic system implemented with a microprocessor adapted with the present invention.

Referring now to FIG. 2, an illustrative embodiment of an electronic system employing a deeply pipelined microprocessor including the present invention is shown. The electronic system 200 includes a microprocessor 210 and possibly additional microprocessors 220 in which their optional implementation is illustrated by dashed lines. At least microprocessor 210 is coupled to a bus 230 configured with any selected bus architecture. For example, bus 230 may be a processor bus which can be interconnected to a chipset of a computer system.

Figure 3:
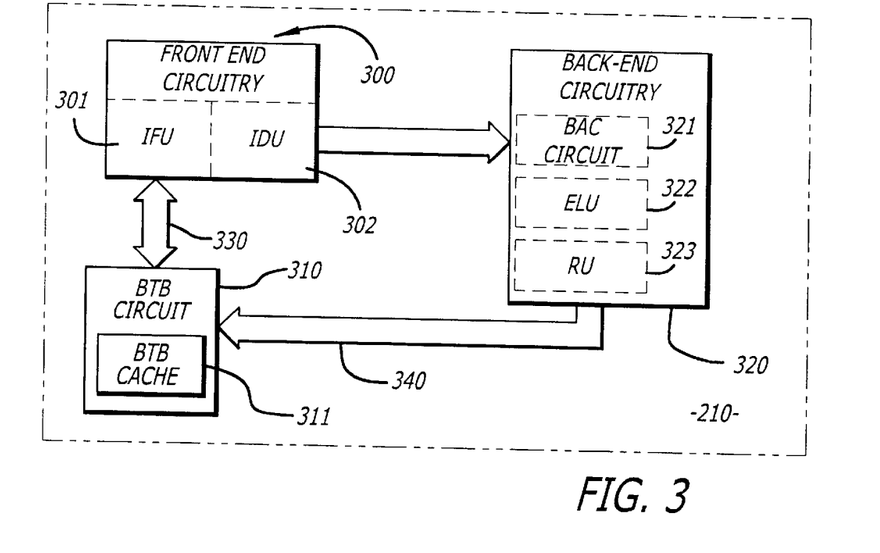
FIG. 3 is a block diagram of logic circuitry implemented within the microprocessor of FIG. 2 including a branch target buffer (BTB) circuit operating in connection with an instruction fetch unit and an execution unit.

Referring now to FIG. 3, an illustrative embodiment featuring the internal logic circuitry of microprocessor 210 is shown. Microprocessor 210 includes front-end circuitry 300, a BTB circuit 310, and back-end circuitry 320. The front-end circuitry 300 may include, but is not limited or restricted to an instruction fetch unit (IFU) 301 and/or an instruction decode unit (IDU) 302. The back-end circuitry 320 may include, but is not limited for restricted to a branch address calculation (BAC) circuit 321, and/or an execution logic unit (ELU) 322 and/or a retirement unit (RU) 323. It is contemplated that other circuits may be implemented within microprocessor 210, but for the scope of the present invention, such circuits need not be described.

The front-end circuitry 300, normally the IFU 301 if implemented, is responsible for continually fetching instructions (e.g., macro instructions) and operands in $2^n$ byte blocks ("n">1) for microprocessor 210 to execute. The existence of branch instructions prevent front-end circuitry 300 from simply fetching instructions along a predetermined sequentially addressed path since the branch condition must be resolved to determine the fetch path.

For improved performance, front-end circuitry 300 consults the BTB circuit 310 via communication line 330 by transferring each instruction pointer (IP) associated with an instruction currently being fetched by front-end circuitry 300. In response, BTB circuit 310 accesses information contained in a BTB cache 311, implemented herein as a single read/write port random access memory (RAM). The BTB cache 311 contains information about branch instructions that have been previously executed by microprocessor 210. The BTB circuit 310 uses BTB cache 311 in an effort to recognize whether any of these instructions are branch instructions that have been previously executed by microprocessor 210. Thereafter, BTB circuit 310 provides a branch prediction for any recognized branch instruction, and transfers the branch prediction back to the front-end circuitry 300 via communication line 330 so that front-end circuitry 300 can fetch subsequent instructions.

Thereafter, if the BTB circuit 310 made a branch prediction for an instruction, front-end circuitry 300, possibly the IDU 302 if implemented, uses the instruction and the branch prediction by the BTB circuit 310 to determine the type of instruction and break down the instruction into one or more micro-operations with associated micro-operands. These micro-operations are executed to perform the function of the corresponding instruction. In other words, the electronic system speculatively executes down this program path.

As further shown in FIG. 3, back-end circuitry 320 is responsible for executing branch micro-operations for microprocessor 210. When back-end circuitry 320 executes a branch micro-operation, it provides branch resolution information to the BTB circuit 310 via communication line 340. The BTB circuit 310 uses the branch resolution information to update an existing entry in BTB cache 311 or to allocate a new entry in BTB cache 311. The branch resolution information is described in FIG. 4.

Figure 4:
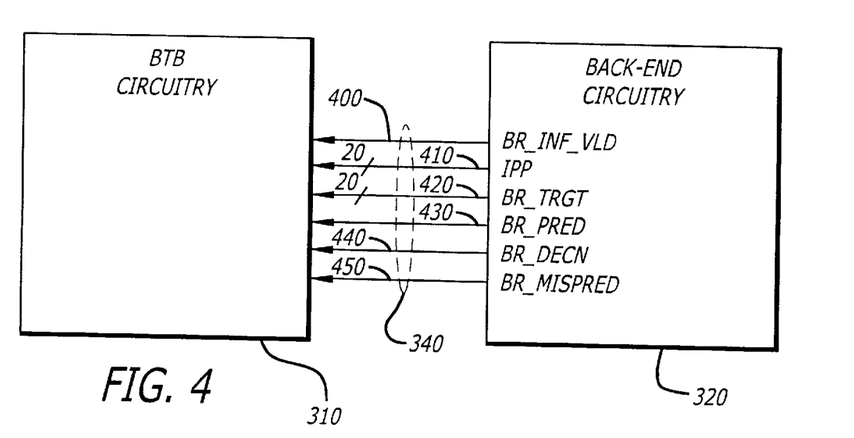
FIG. 4 is a block diagram illustrating the interconnections between the BTB target buffer circuit and the execution unit of FIG. 3.

Referring now to FIG. 4, an illustrative embodiment of communication lines 400, 410, 420, 430, 440 and 450 used to support the transmission of branch resolution information between BTB circuit 310 and the back-end circuitry 320 is described. The back-end circuitry 320 may include the BAC circuit of FIG. 3. More specifically, these communication lines 400–450 are used to provide branch resolution information to help the BTB cache learn the history of branches executed in the code. This information can lead to a write allocation which will lead to a BTB hardware conflict.

As shown, a first communication line 400 is used to indicate whether branch information placed on the communication lines 410–450 is valid. Namely, when the BR_INF_VLD signal is inactive, BTB circuit 310 does not perform any update/allocate operations based on information currently provided by communication lines 410-450. However, if the BR_INF_VLD signal is active, BTB circuit 310 initially determines whether an upcoming cache write involves an update or an allocation. An "update" is a condition where a cache write involves writing information associated with a previously stored branch instruction into an existing entry of the BTB cache. An "allocation" is a condition where a cache write involves writing information associated with a new branch instruction into a newly created entry of the BTB cache. Unlike an update, an allocation requires branch information to be written through the same port of the BTB cache used for prediction. Since the port used for instruction prediction is read each and every cycle, a BTB hardware conflict will occur. In this embodiment, the BTB hardware conflict will occur one (1) cycle after determination of the allocation.

To determine whether the cache write is an allocation or an update, BTB circuit 310 examines information placed on a second communication line 410. In this example, a number of bits (e.g., IPP[10:4]) are used to identify and address a set of entries within the BTB cache. Certain least significant bits (e.g., IPP[3:0]) are designated as offset bits while the remaining most significant bits (e.g., IPP[19:11]) are designated as tag bits. The offset and tag bits are compared with corresponding offset and tag bits found at the set of entries addressed by IPP[10:4]. If an exact match occurs, an update occurs in which case a fifth port ("port 5") is used to load branch information so that a BTB hardware conflict would not occur. However, if an exact match is not found, an allocation occurs in which the same port used for cache reads is required to write new branch information into the BTB cache.

A third communication line 420 provides a target IP of the branch instruction; namely, a destination address for the branch instruction. The third communication line 420 includes twenty (20) lines for transmission of the IP as shown. Twenty lines are arbitrarily chosen due to space limitations. The remaining communication lines 430, 440 and 450 provide control information to indicate (i) whether the current instruction is a predicted branch instruction, (ii) whether the branch was "taken" or "not taken," and (iii) whether or not a branch instruction was mispredicted, respectively.

Figure 5:
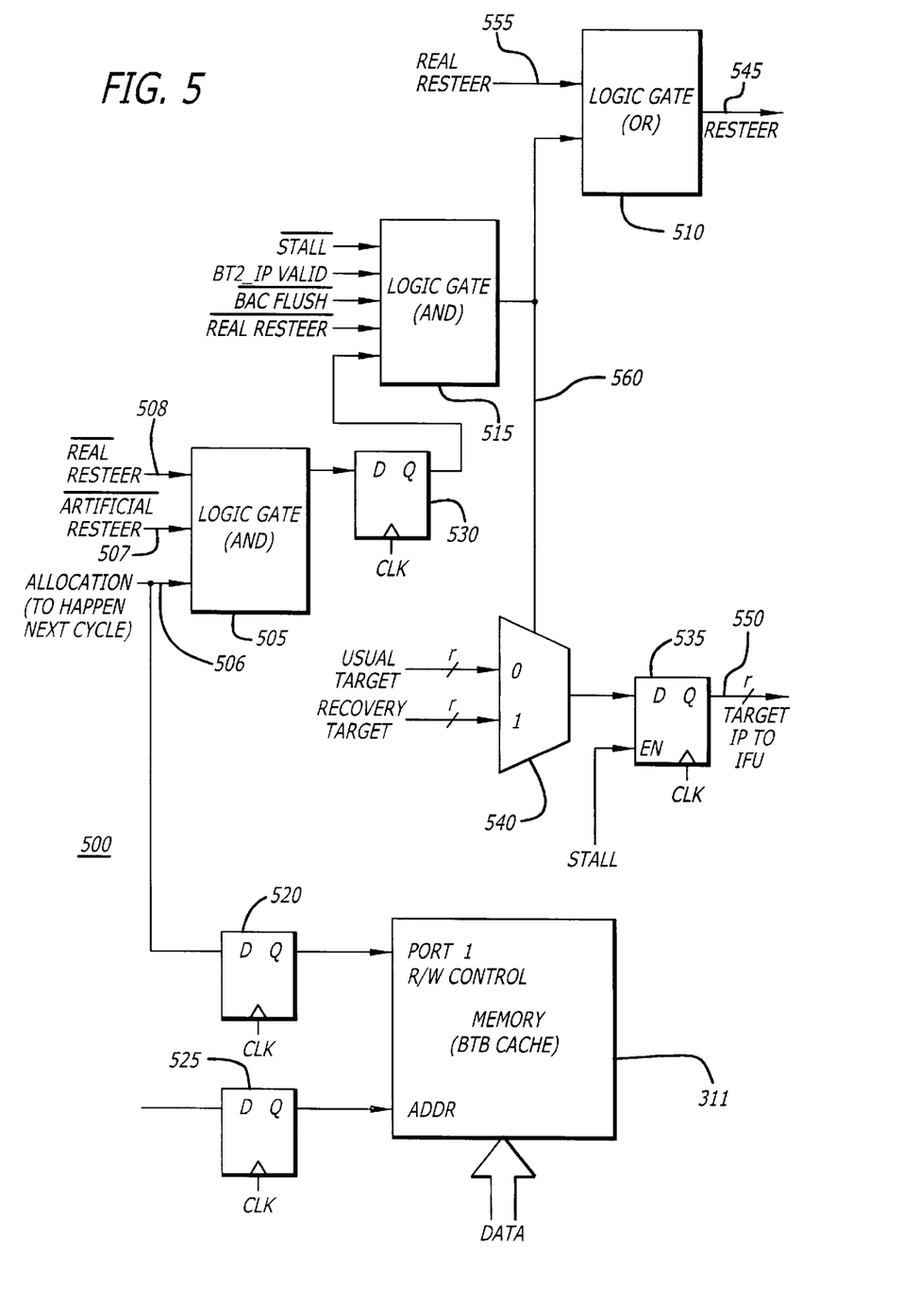
FIG. 5 is an illustrative embodiment of the logic circuitry employed in the BTB circuit of FIG. 3.
Figure 6:
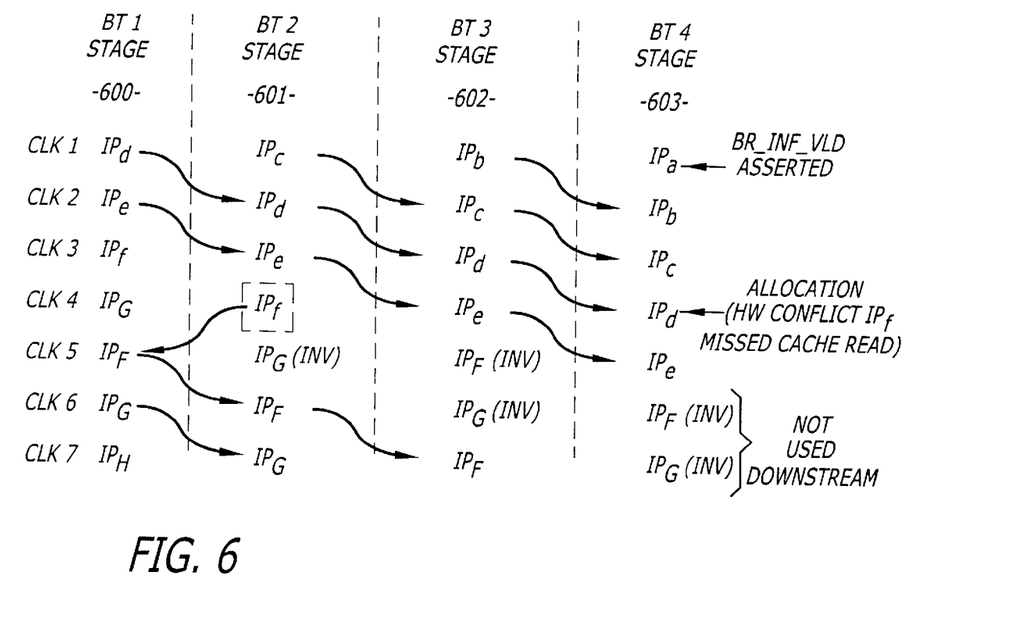
FIG. 6 is a diagram illustrating how instruction pointers can be deferred in the existence of a BTB hardware conflict without discounting the prediction or conducting a hardware stall.
Figure 7:
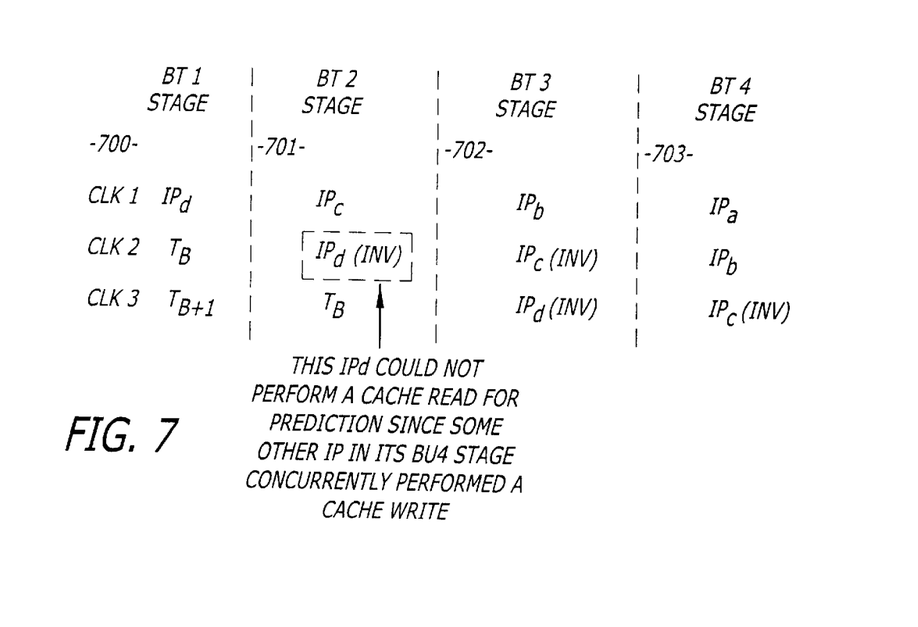
FIG. 7 is an illustrative diagram of real BTB prediction resteer without a potential BTB hardware conflict.

Referring now to FIG. 5, illustrative logic circuitry 500 implemented within the BTB circuit is described. The logic circuitry 500 includes a plurality of logic gates 505, 510 and 515; a plurality of delay devices 520, 525, 530 and 535; a select device 540; a resteer output 545; and a valid target output 550. The resteer output 545 indicates if front-end circuitry has to be resteered either due to a real resteer (e.g., normal prediction) or an artificial resteer being a recovery of an IP whose read was suppressed due to a cache write. This output 545 will also cause invalidation of appropriate in-flight IPs as shown in FIGS. 6–7. The valid target output 550 is "r" bits wide ("r" is a positive whole number such as 32) and provides the IP loaded into the instruction pipeline.

As shown, a first logic gate 505 of the plurality of logic gates functions as a three-input AND gate. During a first clock cycle, the first input 506 receives an active ALLOCATION signal when an allocation is to occur in a second clock cycle. This would cause a BTB hardware conflict to occur as a result of simultaneous accesses to the BTB cache for both a cache read (prediction) and a cache write. In response, a single clock cycle delay is imposed on the ALLOCATION signal by a delay device 520 such as a flip-flop clocked by internal clock "CLK". This allows a read/write control port ("port 1") of the BTB cache 311 to be appropriately set so that information associated with a new branch instruction is written into the BTB cache 311 during the second clock cycle at an address provided to ADDR port of BTB cache 311 via delay device 525.

During the same cycle as this cache write, the resteer output 545 is asserted. In order to prevent the electronic system from experiencing performance loss, recovery of an instruction will not be predicted in a subsequent cycle. The other inputs 507 and 508 of the first logic gate are configured to receive active signals when no BTB resteer conditions (both real and artificial resteer) are detected during the cycle. This output is transferred to a delay device 530 which imposes a single clock cycle delay. This delay ensures that the BTB resteer pulse is sent to the IFU in the cycle that the BTB cache is being written.

As shown, by implementing a logic gate (e.g., a two-input OR gate) 510, two conditions cause assertion of the resteer output 545; namely, a real resteer is occurring and is represented through assertion of line 555 or an artificial resteer (allocation) is occurring (in the absence of certain conditions) as represented by line 560. The allocation, absent the conditions set forth below, is represented by providing an active signal from a third logic gate 515 functioning as a five-input AND gate. The active signal would be provided to an input of second logic gate 510 and a select input of select device 540. The third logic gate 515 produces an active signal if five conditions are met: (i) no stall condition in the second clock cycle, (ii) the IP of BT2 is valid, (iii) the back-end circuitry is not causing a pipeline flush, (iv) no real resteer condition is occurring, and (v) an allocation is occurring. If all these conditions are satisfied, the resteer output 545 is asserted and the select device 540 outputs a recovered IP provided to a delay device 535. Thus, the recovered IP is loaded into the instruction pipeline during a third clock cycle. Otherwise, the usual sequential IP address is used for fetching.

Referring now to FIG. 6, an illustrative example of the operations of the BTB circuit in recovering instruction pointers that were precluded from being used as a cache read for prediction is shown. Herein, a front-end BTB pipeline is shown to include four stages referred to as BT1–BT3 600–603. Each stage is responsible for performing various operations on instruction pointers ($IP_a$–$IP_d$) loaded into the BTB pipeline as described in FIG. 1C. For example, BT2 stage 601 is where the IP is used for a cache read while BT3 602 is where information associated with the IP is used to detect whether an allocation or update is necessary. The pipeline flow is shown over seven (7) clock cycles referred to as CLK1–CLK7.

During a first clock cycle (CLK1), a BR_INF_VLD signal is detected by the BTB circuit to be active. This indicates that an allocation may occur, requiring information associated with a new branch instruction to be loaded into the BTB cache. For this BTB pipeline embodiment, a period of four clock cycles (CLK1–CLK4, CLK2–CLK5, etc.) is necessary before an IP, associated with an allocation and loaded into the BTB pipeline is involved with a cache write. Thus, a second and third clock cycles (CLK2 and CLK3) undergo normal prediction and propagation through the BTB pipeline. However, at CLK4, the BTB cache undergoes a cache write. Since the cache write takes precedence over a cache read, front-end circuitry is unable to perform a cache read at BT2 stage 601 for prediction purposes.

In order to recover the missed opportunity to predict, the in-flight IP scheduled to be used in a cache read and preempted by the cache write (referred to as the non-predicted IP") is invalidated. Furthermore, one or more in-flight IP(s) which are more recently input into the pipeline (i.e., "younger") are also invalidated. As a result, $IP_f$ and $IP_g$ are invalidated as shown.

After invalidation of the non-predicted IP and younger in-flight IP(s), the non-predicted IP is restarted at the front end of the BTB pipeline at the start of the fifth clock cycle (CLK5) while invalid $IP_f$ and $IP_g$ continue their propagation through the BTB pipeline. These particular $IP_f$ and $IP_g$ will not be executed by the electronic system. This represents the artificial resteer condition described above. At CLK6, the non-predicted IP ($IP_f$) is read by the BTB cache and during the seventh clock cycle (CLK7), $IP_f$ is ready for prediction. Thus, a two-clock delay is imposed due to this artificial resteer, but such delay will likely be absorbed by downstream buffers.

Referring to FIG. 7, an illustrative diagram of real BTB prediction resteer with a potential BTB hardware conflict in a following cycle is shown. Similar to FIG. 6, the BTB pipeline includes four stages referred to as BT1–BT4 701–703 in which instruction pointers ($IP_a$–$IP_d$) are already loaded into the BTB pipeline. At a first clock cycle ($CLK_1$), the BTB circuit detects a resteer condition associated with $IP_b$ (e.g., a branch instruction). In this case, an artificial resteer associated with $IP_d$ is suppressed because the BTB circuit is configured to refrain from predicting for two clock cycles after a resteer condition. This is accomplished by invalidating $IP_c$ and $IP_d$ which is an in-flight IP younger than $IP_c$. In other words, the lost prediction would not have been used downstream so no recovery is needed.

Figure 8:
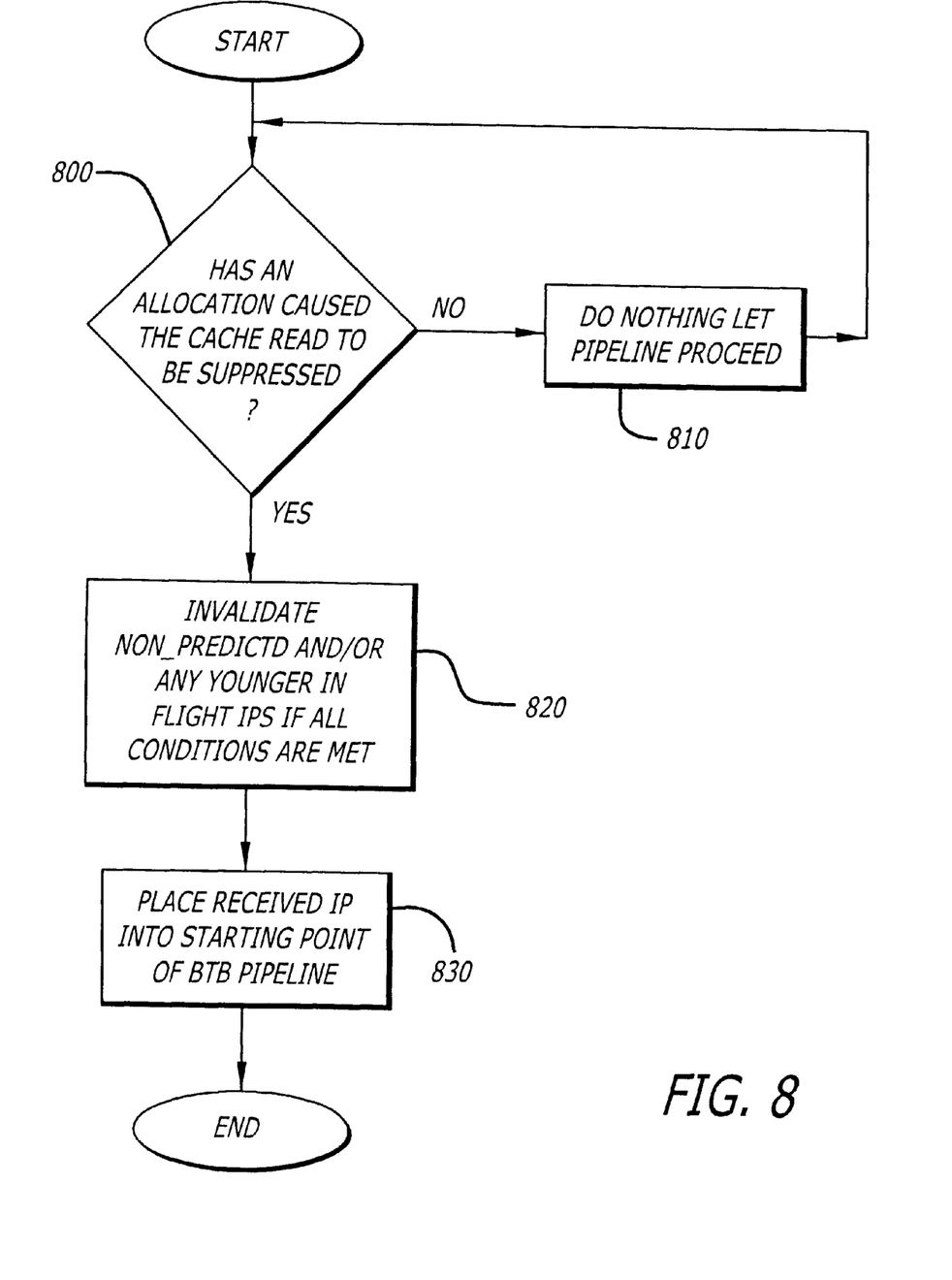
FIG. 8 is an illustrative flowchart describing the steps performed by the BTB circuit when a BTB hardware conflict exists.

Referring to FIG. 8, an illustrative flowchart describing the steps performed by the BTB circuit when a BTB hardware conflict exists is shown. First, a determination is made by the BTB circuit whether an allocation by back-end circuitry is detected which causes a cache read to be suppressed (Step 800). If not, the BTB pipeline proceeds with its normal operation and repeats the operation of Step 800 (Step 810). If the allocation is detected, the IP associated with the suppressed cache read (non-predicted IP) in the following cycle is invalidated along with at least one in-flight IP younger than the non-predicted IP (Step 820). Thereafter, the non-predicted IP is recovered and placed into the front-end BTB pipeline for subsequent prediction (Step 830). As a result, a hardware conflict is avoided and a missed prediction opportunity is recovered.

What is claimed is:

1. A method comprising:
    detecting a write allocation to a branch target buffer (BTB) cache concurrent with a read to the BTB cache;
    performing the write allocation and invalidating at least one instruction pointer placed within a BTB pipeline, the at least one instruction pointer including a first instruction pointer associated with a BTB cache read suppressed in favor of the write allocation; and
    recovering the first instruction pointer by reloading the first instruction pointer into the BTB pipeline.

2. The method of claim 1, wherein invalidating the at least one instruction pointer includes invalidating the first instruction pointer and at least a second instruction pointer placed in the BTB pipeline after the first instruction pointer.

3. The method of claim 1, wherein the detecting the write allocation includes:
    transferring a first signal to a BTB circuit including the BTB cache, the first signal indicating that information on a plurality of communication lines is valid; and
    determining whether information to be written into the BTB cache is not associated with a branch condition that is currently assigned an entry of the BTB cache.

4. The method of claim 3, wherein the determining whether information is not associated with a branch condition includes:

providing information to address a set of entries within the BTB cache;

providing a tag and an offset associated with the branch condition;

comparing the tag and the offset with corresponding tag and offset bits found at the set of entries within the BTB cache; and     confirming the write allocation if the tag and the offset compare with the corresponding tag and offset bits.

5. The method of claim 2, wherein the recovery of the first instruction pointer includes reloading the second instruction pointer into the BTB pipeline after the first instruction pointer.

6. A branch instruction prediction mechanism comprising:

front-end circuitry that fetches and places an instruction within a pipeline and transmits a first instruction pointer associated with the instruction for branch prediction;

back-end circuitry that writes information into a branch target buffer (BTB) cache; and     a branch target buffer (BTB) circuit coupled to the front-end circuitry and the back-end circuitry, the BTB circuit including the branch target buffer (BTB) cache, in response to a BTB hardware conflict the BTB circuit enabling a write allocation to be performed by the back-end circuitry instead of the branch prediction by the front-end circuitry by (i) invalidating at least the first instruction pointer associated with a suppressed cache read to allow the write allocation to proceed, and (ii) recovering the first instruction pointer by reloading the first instruction pointer into the pipeline.

7. The branch instruction prediction mechanism of claim 6, wherein the front-end circuitry including an instruction fetch unit in communication with the BTB circuit.

8. The branch instruction prediction mechanism of claim 7, wherein the instruction fetch unit of the front-end circuitry is capable of loading information associated with the first instruction into a port of the BTB cache.

9. The branch instruction prediction mechanism of claim 6, wherein the back-end circuitry including a branch address calculation circuit.

10. A method comprising:

performing a write allocation to a branch target buffer (BTB) circuit;

performing with a cache read to the BTB circuit concurrently with the write allocation;

invalidating at least one instruction pointer placed within a pipeline of the BTB circuit, the at least one instruction pointer including a first instruction pointer associated with the cache read which is suppressed to allow the write allocation to proceed; and     recovering the first instruction pointer by reloading the first instruction pointer into the BTB pipeline.

11. A method comprising:

detecting a write allocation to a port of a branch target buffer (BTB) cache concurrent with a read to the port of the BTB cache;

invalidating at least one instruction pointer placed within a BTB pipeline, the at least one instruction pointer including a first instruction pointer associated with the BTB cache read suppressed in favor of the write allocation; and     recovering the first instruction pointer by reloading the first instruction pointer into the BTB pipeline.

* * * * *